(12) United States Patent
Rampf

(10) Patent No.: US 12,552,069 B2
(45) Date of Patent: Feb. 17, 2026

(54) METHOD OF MANUFACTURING A MOLD INSERT FOR THE PRODUCTION OF MOLDINGS, AND MOLD INSERT AND ITS USE

(71) Applicant: FORMWERK GMBH, Erbach (DE)

(72) Inventor: Achim Rampf, Erbach (DE)

(73) Assignee: formwerk GmbH, Erbach (DE)

(*) Notice: Subject to any disclaimer, the term of this patent is extended or adjusted under 35 U.S.C. 154(b) by 630 days.

(21) Appl. No.: 17/637,232

(22) PCT Filed: Aug. 18, 2020

(86) PCT No.: PCT/DE2020/100719
§ 371 (c)(1),
(2) Date: Feb. 22, 2022

(87) PCT Pub. No.: WO2021/032249
PCT Pub. Date: Feb. 25, 2021

(65) Prior Publication Data
US 2022/0274286 A1 Sep. 1, 2022

(30) Foreign Application Priority Data
Aug. 20, 2019 (DE) ............ 10 2019 122 309.1

(51) Int. Cl.
*B28B 7/34* (2006.01)
*B23K 1/00* (2006.01)
(Continued)

(52) U.S. Cl.
CPC ........... *B28B 7/346* (2013.01); *B23K 1/0008* (2013.01); *B23K 35/327* (2013.01);
(Continued)

(58) Field of Classification Search
None
See application file for complete search history.

(56) References Cited

U.S. PATENT DOCUMENTS 1,547,529 A 7/1925 Stanton
5,445,514 A 8/1995 Heitz
(Continued)

FOREIGN PATENT DOCUMENTS

DE 1185967 B 1/1965
DE 102010016444 A1 10/2011
(Continued)

OTHER PUBLICATIONS

Braun O et al, "Vakuumloten, Ein Fugeverfahren Mit Vorteilen", [Vacuum Soldering, a Joint Process With Advantages], Technische Rundschau, Hallwag, Bern; CH, DE, vol. 80, No. 42, Oct. 14, 1988 (Oct. 14, 1988), p. 60/61, XP000023097, ISSN:1023-0823, the whole document—English machine translation.
(Continued)

*Primary Examiner* — Devang R Patel
(74) *Attorney, Agent, or Firm* — Laurence A. Greenberg; Werner H. Stemer; Ralph E. Locher

(57) ABSTRACT

A method of manufacturing a mold insert for the production of moldings, in particular blocks or slabs, in which a plurality of strips that form wall elements of the mold insert to be manufactured are interlocked by connecting elements and the interlocked strips are soldered to each other. There is also described a mold insert for producing moldings and to its use.

11 Claims, 2 Drawing Sheets

(51) Int. Cl.
  *B23K 35/32* (2006.01)
  *B28B 7/00* (2006.01)
  *B23K 1/008* (2006.01)
  *B23K 1/20* (2006.01)

(52) U.S. Cl.
  CPC ............ *B28B 7/0014* (2013.01); *B23K 1/008* (2013.01); *B23K 1/20* (2013.01)

(56) References Cited

U.S. PATENT DOCUMENTS

| | | | |
|---|---|---|---|
| 7,014,161 B2 * | 3/2006 | Rampf | B28B 1/081 |
| | | | 425/432 |
| 8,815,983 B2 * | 8/2014 | Gerk | C04B 35/63464 |
| | | | 523/210 |
| 9,370,873 B2 | 6/2016 | Stichel et al. | |
| 2012/0001360 A1 * | 1/2012 | Melvin | B28B 7/0061 |
| | | | 264/119 |
| 2017/0252944 A1 | 9/2017 | Dauben et al. | |

FOREIGN PATENT DOCUMENTS

| | | |
|---|---|---|
| DE | 102010060742 A1 | 5/2012 |
| DE | 102013208572 A1 | 11/2014 |
| DE | 102014012738 A1 | 3/2016 |
| DE | 102018101164 A1 | 7/2019 |
| EP | 0252049 A1 | 1/1988 |
| JP | 11254128 A * | 9/1999 |
| JP | 4445489 B1 | 4/2010 |

OTHER PUBLICATIONS

Bao J et al, "Wear-Resistance WC Composite Hard Coatings by Brazing", Journal of Materials Engineering and Performance, Asm International, Materials Park, OH, US, vol. 13, No. 4, Aug. 1, 2004 (Aug. 1, 2004), p. 385-388, XP001200141, DOI: 10.1361/10599490419874 external link, ISSN:1059-9495, the whole document.

* cited by examiner

METHOD OF MANUFACTURING A MOLD INSERT FOR THE PRODUCTION OF MOLDINGS, AND MOLD INSERT AND ITS USE

FIELD AND BACKGROUND OF THE INVENTION

The invention relates to a method for manufacturing a mold insert for producing shaped bodies. The invention also relates to a mold insert for the production of shaped bodies and to the use thereof.

In the production of shaped bodies, in particular concrete blocks or concrete slabs, a mold insert is often used. This is a shaping device having one or more cavities, what are referred to as mold impressions or mold honeycombs, for receiving a molding compound that forms the shaped bodies to be manufactured.

A known method for producing shaped bodies provides the use of a mold insert in a molding machine equipped with a vibrating table. In this respect, the mold insert is placed in a molding frame which is arranged on the vibrating table. A molding load is arranged in turn on the mold insert filled with the molding compound. A vibrational movement of the vibrating table gives rise to a uniform distribution and compaction of the molding compound in the mold impressions of the mold insert.

A mold insert for use in a molding machine equipped with a vibrating table is disclosed, for example, in patent document EP 1 509 374 B1.

Up to now, it was conventional to manufacture mold inserts for producing shaped bodies from solid metallic blocks, in particular solid steel blocks. In this respect, in order to manufacture a mold insert the mold impressions are cut out of a solid metallic block by flame cutting or milling. Such a manufacturing method has the disadvantage, however, that it is very energy-intensive and, owing to the large proportion of material that is cut out, is also very material-intensive.

SUMMARY OF THE INVENTION

The invention is based on the object of specifying a method for manufacturing a mold insert for producing shaped bodies, by means of which method the mold insert can be manufactured in an energy-efficient and material-efficient manner.

This object is achieved according to the invention by a method having the features as claimed.

The invention is also based on the object of providing a mold insert for producing shaped bodies, which mold insert can be manufactured in an energy-efficient and material-efficient manner.

This object is achieved according to the invention by a mold insert having the features of independent claim 9.

The dependent claims respectively relate to preferred refinements of the invention.

The method according to the invention for manufacturing a mold insert for producing shaped bodies, in particular blocks or slabs, provides that
  multiple strips, which form wall elements of the mold insert to be manufactured, are fitted together using connecting elements and
  the fitted-together strips are soldered to one another.

The use of multiple strips, which are fitted together and soldered to one another, as wall elements of the mold insert makes it possible to dispense with cutting one or more mold impressions out of a solid block in an energy-intensive and material-intensive manner.

Fitting the strips together using the connecting elements makes it possible to comfortably and precisely position the strips relative to one another before they are soldered to one another. This makes it possible to achieve high angular and dimensional accuracy of the mold insert. In particular, this makes it possible to exactly maintain right angles between adjacent strips.

By soldering the strips together, it is possible to achieve high stiffness, together with an ability to bear high dynamic loads, of the mold insert. Compared with other joining methods, such as welding, it is possible to avoid high mechanical stresses arising in the region of the joining points when the strips are being soldered together, which can have an adverse effect on the service life of the mold insert.

An advantage of the method is moreover that materials that cannot be processed or can be processed only with difficulty by means of flame cutting or milling can be used for the strips. For example, it is possible to use a steel grade with a high carbon proportion that cannot be flame cut or can be flame cut only with difficulty as the material for the strips. The method thus has high variability in terms of the materials that can be used in the manufacture of the mold insert. In particular, the method is not restricted to the use of metals, such as steel, since it is also possible to use ceramic materials for the strips, for example.

If a mold insert having multiple mold impressions is manufactured in the method, a further advantage is that, on account of the high angular and dimensional accuracy of the mold insert that can be achieved in the method it is not necessary to individually match what are referred to as pressure pieces of a molding load, which are arranged above the mold impressions that are filled with the molding compound, to the shape and/or dimensions of the individual mold impressions. Even if a mold insert having a single mold impression is manufactured in the method, on account of the high angular and dimensional accuracy of the mold insert that can be achieved it is not necessary to match the corresponding pressure piece of a molding load to the shape and/or dimensions of the mold impression.

Use is preferably made of a solder paste (hard solder), in particular a solder paste of an alloy containing silver and/or copper, as the solder for soldering the strips together. The solder paste is expediently applied to those points on the strips at which the strips are to be soldered to one another, that is to say at what are referred to as the joining points. In particular, it is advantageous if the solder paste is applied only to the joining points on the strips.

Advantageously, the fitted-together strips are soldered to one another using a vacuum soldering method. This is expediently performed in a vacuum furnace. An advantage of soldering by means of a vacuum soldering method is that oxidation of the strips, in particular at the joining points, and an associated undesired change in the material properties of the strips can be avoided.

The vacuum soldering method is preferably a high-temperature vacuum soldering method. In the high-temperature vacuum soldering method, it may be provided that the strips are heated to a temperature of at least 900° C., preferably at least 1000° C. It may be provided in particular that the strips are heated to a temperature of approx. 1150° C. in the high-temperature vacuum soldering method.

If appropriate, the strips may be heated in stages. That is to say, the strips can be heated in such a way that the temperature of the strips is held once or more than once at a predefined temperature level for a predetermined period of time, before the temperature of the strips is increased further.

After the strips have been soldered together, the strips are advantageously allowed to cool down to ambient temperature, in particular in the vacuum. It is particularly advantageous if the strips are allowed to cool down to ambient temperature without the soldered-together strips having been quenched beforehand in a liquid coolant, such as water or oil. This makes it possible to largely avoid distortion of the soldered-together strips, in particular distortion that occurs during the quenching due to microstructural changes in the strips, with the result that the previously achieved high angular and dimensional accuracy of the soldered-together strips can be maintained.

If appropriate, the strips can be allowed to cool down in stages. That is to say, it is possible to allow the strips to cool down in such a way that the temperature of the strips is held once or more than once at a predefined temperature level for a predetermined period of time, before the temperature of the strips is lowered further.

In an advantageous refinement of the invention, a wear-protection layer is formed on the strips, in particular after they have been fitted together. This makes it possible to achieve a longer service life of the mold insert. The wear-protection layer may serve, for example, to protect the strips against abrasive and/or corrosive wear.

An advantageous embodiment of the invention provides that a hard material is applied to the fitted-together strips before they are soldered together. It is particularly advantageous if, when the strips are being soldered together, the wear-protection layer is formed on the strips from the applied hard material, in particular by a compaction of the applied hard material that is brought about during the soldering process. In this way, the soldering-together operation and the formation of the wear-protection layer can be implemented in a single, common process step. This makes it possible to reduce the outlay on energy and time for the manufacture of the mold insert compared to the case in which the wear-protection layer is effected in a separate energy-intensive and time-intensive method step, such as case hardening or nitriding.

The above wording "wear-protection layer formed from the hard material" should not necessarily be understood to mean that the wear-protection layer consists exclusively of the hard material. That is to say, the wear-protection layer may contain further constituent parts in addition to the hard material, if appropriate.

The hard material may be applied to the strips after the strips have been fitted together or before the strips have been fitted together.

A carbide, in particular tungsten carbide, titanium carbide or chromium carbide, may be used as hard material, for example. It has been found that carbides, such as tungsten carbide, titanium carbide or chromium carbide, are particularly well suited for obtaining a good protective effect of the wear-protection layer.

The hard material may be applied to, in particular sprayed onto, the strips in the form of a constituent part of a hard material/solder suspension, for example. The hard material may be present in the form of powder, for example, in the hard material/solder suspension.

In a preferred variant embodiment of the invention, the hard material/solder suspension is applied to the strips by being sprayed on. By being sprayed on, the hard material/solder suspension can be applied to the strips with little outlay on time and work. It may further be provided that the hard material/solder suspension is allowed to dry in air or in another gas atmosphere after it has been sprayed on.

According to an advantageous embodiment of the invention, for the purpose of forming the wear-protection layer, the hard material, preferably in the form of a constituent part of a hard material/solder suspension, is applied at least to those surfaces of the strips at which the strips will come into contact with the molding compound, such as concrete, during the production of shaped bodies. It may be provided in particular that the hard material, preferably in the form of a constituent part of a hard material/solder suspension, is applied only to these surfaces of the strips. As an alternative, it may be provided that the hard material, preferably in the form of a constituent part of a hard material/solder suspension, is applied, in addition to these surfaces, also to other surfaces of the strips, in particular to all surfaces of the strips, for example by applying the hard material to the strips by way of a dip-coating method.

The mold insert according to the invention for producing shaped bodies, in particular blocks or slabs, comprises multiple strips that have been fitted together using connecting elements and soldered to one another and form wall elements of the mold insert.

It is possible to use the method according to the invention to manufacture the mold insert according to the invention.

The features and advantages mentioned above in conjunction with the method can similarly relate to the mold insert.

The mold insert may comprise one or more cavities, what are referred to as mold impressions, for receiving a molding compound, such as a concrete compound or ceramic compound, which one or more cavities is/are delimited by the strips.

Advantageously, each of the strips has one or more openings for receiving the above-mentioned connecting elements, the connecting elements being inserted in said openings.

The strips of the mold insert preferably have a thickness of at least 8 mm. The thickness of a strip is to be understood in the present case to mean its extent from the bottom side of the mold insert to the top side of the mold insert.

In addition, adjacent strips are preferably arranged at right angles to one another. In this way, cuboidal mold impressions can be formed by the strips.

In an advantageous refinement of the invention, the mold insert comprises a wear-protection layer arranged on the strips, in particular a wear-protection layer containing a hard material.

The wear-protection layer preferably has a hardness of at least 55 HRC, in particular at least 60 HRC.

It is also advantageous if the wear-protection layer has a layer thickness of at least 25 µm, preferably at least 50 µm. This makes it possible to ensure a good protective action of the wear-protection layer. It is moreover preferred if the layer thickness of the wear-protection layer is at most 1 mm, preferably at most 0.5 mm, in particular because this makes it possible to keep the material requirement for the wear-protection layer low.

Said connecting elements are preferably in the form of pin-shaped connecting elements. The connecting elements may be fabricated from metal, for example.

It is also expedient if the connecting elements are inserted in openings in the strips, which openings are provided for receiving the connecting elements.

At least one of the strips of the mold insert may be a metal strip, in particular a steel strip, for example. As an alternative or in addition, it may be provided that at least one of the strips of the mold insert is a ceramic strip, in particular a metallized ceramic strip.

In an advantageous variant embodiment of the invention, at least one of the strips of the mold insert is fabricated from a different material than the other strips. It may be provided, for example, that all of the strips of the mold insert are fabricated from steel, wherein at least one of the strips is fabricated from a steel of a different steel grade than the other strips.

In an alternative variant embodiment of the invention, all strips of the mold insert are fabricated from the same material.

According to the invention, the use of the mold insert according to the invention for producing shaped bodies, in particular blocks or slabs, is provided.

It is possible to use concrete or stoneware, for example, as the molding compound from which the shaped bodies are formed.

An advantageous use of the mold insert is its use in a hermetic press for producing shaped bodies by means of a hermetic pressing method.

In particular, it is possible to use the mold insert advantageously for producing what are referred to as terrazzo slabs.

The method steps mentioned further above for forming the wear-protection layer are also suitable in the case of a mold insert manufactured in a different way than by the fitting together and soldering together of strips, in order to form a wear-protection layer on the mold insert. The above-mentioned method steps for forming the wear-protection layer can be used, for example, in the case of a mold insert formed in one piece, in particular a mold insert manufactured by flame cutting or milling from a solid metallic block, for the purpose of forming a wear-protection layer on the mold insert. An advantage of the above-mentioned method steps for forming a wear-protection layer is that the angular and dimensional accuracy of the mold insert can at least substantially be maintained, in particular since distortion of the mold insert when the wear-protection layer is being formed can be largely avoided.

In order to form a wear-protection layer on such a mold insert that is not manufactured according to the invention and in particular is formed in one piece, it is possible to proceed by spraying onto or otherwise applying to the mold insert a hard material, for example in the form of a constituent part of a hard material/solder suspension, and thereafter heating the mold insert, in particular in a vacuum furnace, preferably to a temperature of at least 900° C., particularly preferably at least 1000° C. In this context it is possible to use the materials mentioned further above as hard material, for example. If appropriate, the mold insert may be heated in stages. The temperature to which the mold insert is heated may be for example approx. 1150° C.

After being heated, the mold insert may be allowed to cool down to ambient temperature, in particular in the vacuum. It is particularly advantageous if the mold insert is allowed to cool down without the mold insert having been quenched beforehand in a liquid coolant, such as water or oil. This makes it possible to largely avoid distortion of the mold insert, in particular distortion that occurs during quenching due to microstructural changes in the mold insert. If appropriate, the mold insert may be allowed to cool down in stages.

The invention will be explained in more detail below on the basis of figures. If it is appropriate, in this respect identical or identically acting elements are provided with the same reference signs. The invention is not restricted to the embodiments illustrated in the figures, including in terms of functional features. The description so far and the description of the figures below include numerous features that are reproduced in the dependent claims, in some cases together. However, a person skilled in the art will also consider these features individually and combine them to form appropriate further combinations. In particular, these features can be respectively combined individually and in any desired suitable combination with the method according to the invention, the mold insert according to the invention and/or the use according to the invention.

DETAILED DESCRIPTION OF THE INVENTION

Figure 1:
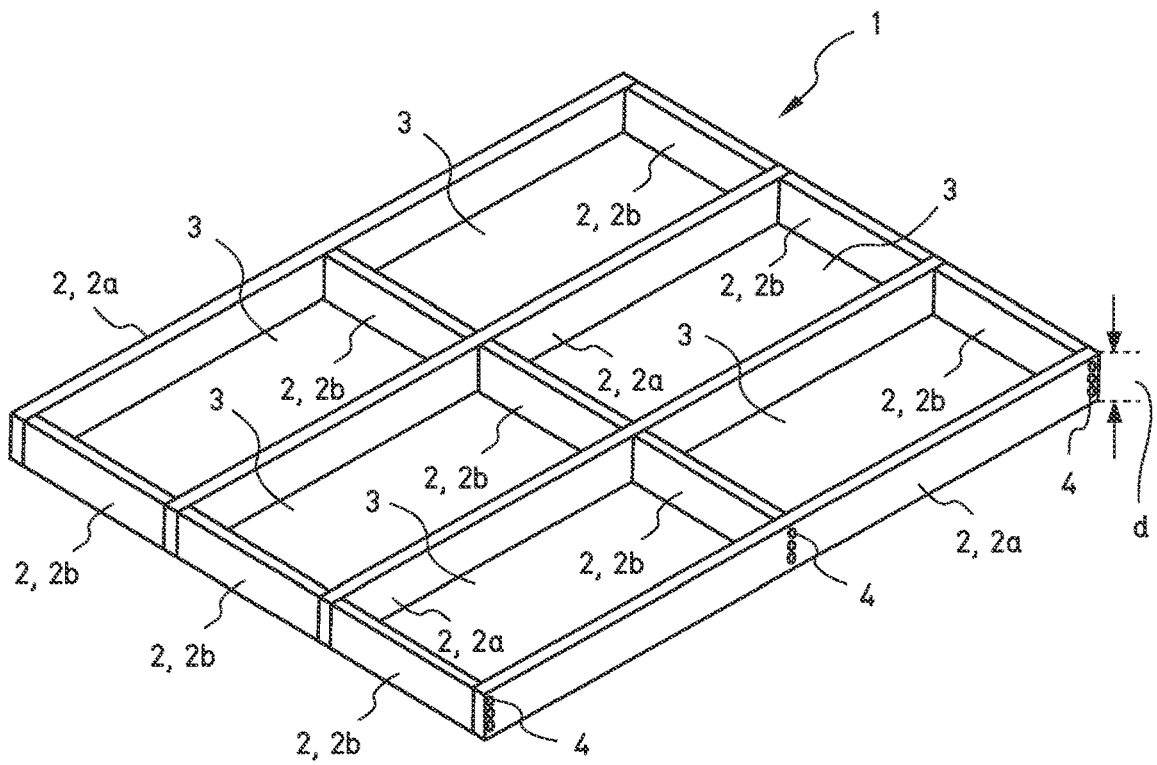
FIG. 1 shows a perspective illustration of an exemplary embodiment of a mold insert according to the invention.

FIG. 1 shows a perspective illustration of a mold insert 1 for producing shaped bodies, in particular concrete blocks, in an oblique view from above.

The mold insert 1 comprises multiple strips 2, more specifically multiple longitudinal strips 2a that are arranged parallel to one another and multiple transverse strips 2b that are arranged at right angles to the longitudinal strips 2a. The strips 2 of the mold insert 1 form the wall elements of said mold insert. All of the strips 2 of the mold insert 1 have the same thickness d, for example a thickness of 12 mm.

As can be seen from FIG. 1, each of the two end faces of each of the transverse strips 2b adjoins one of the longitudinal strips 2a of the mold insert 1.

Furthermore, the mold insert 1 comprises multiple cuboidal mold impressions 3, which are delimited by the strips 2 and serve to receive a molding compound. The mold insert 1 from FIG. 1 comprises by way of example four longitudinal strips 2a, nine transverse strips 2b and six mold impressions 3. In principle, the mold insert 1 may comprise a different number of longitudinal strips 2a, transverse strips 2b and mold impressions 3.

If appropriate, the strips 2 may have, on their surfaces that delimit the mold impressions 3, one or more respective grooves (not illustrated in the figures) for forming projections on the shaped bodies to be manufactured.

The mold insert 1 further comprises multiple pin-shaped connecting elements 4, by means of which the strips 2 are fitted together. In addition, the strips 2 of the mold insert 1 are soldered to one another and covered with a wear-protection layer containing a hard material, in particular with a wear-protection layer containing chromium carbide, titanium carbide or tungsten carbide.

The strips 2 of the mold insert 1 may be metallized ceramic strips, for example. As an alternative, the strips 2 of the mold insert 1 may be steel strips, for example. In the latter case, it may be provided in particular that some of the strips 2 consist of a steel of a different steel grade than the other strips 2. For example, the longitudinal strips 2a may consist of a steel of a first steel grade, while the transverse strips 2b consist of a steel of a second steel grade.

Said connecting elements 4 are inserted in openings in the strips 2, which openings are provided for receiving the connecting elements 4, each of the connecting elements 4 engaging in two openings of two adjacent strips 2. In the case of the transverse strips 2b, the openings provided for receiving the connecting elements 4 are located in the end faces of said transverse strips. In the case of the longitudinal strips 2a, the openings provided for receiving the connecting elements 4 are located in the front and rear sides of said longitudinal strips, specifically in the present exemplary embodiment in the center and in the two ends of the respective longitudinal strip 2a.

Figure 2:
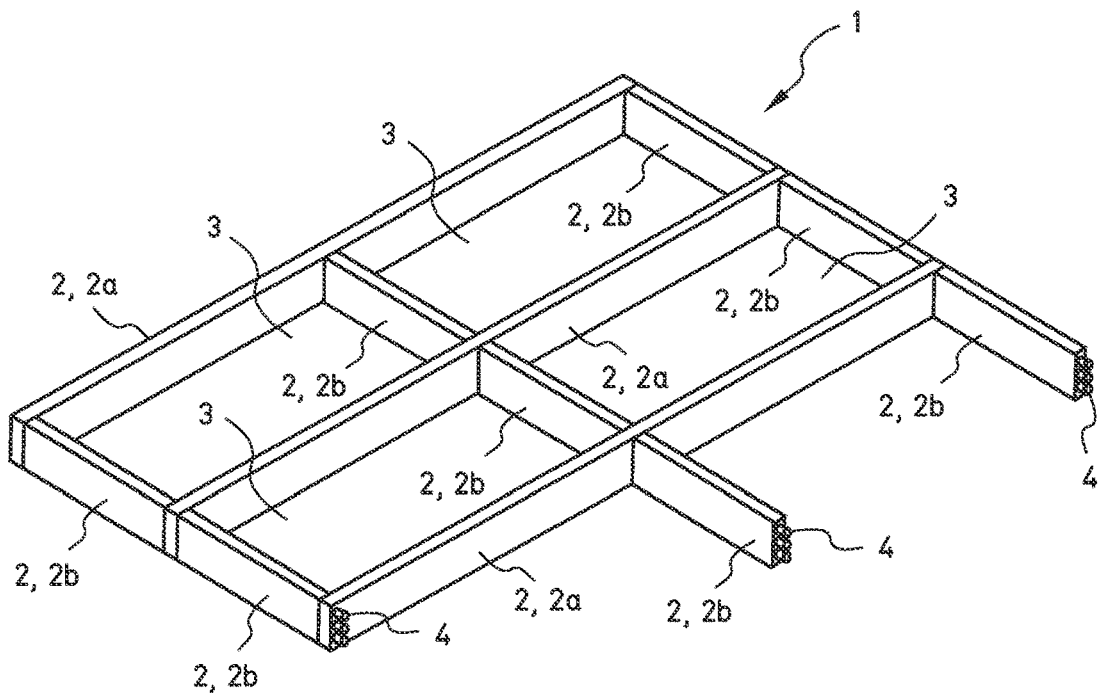
FIG. 2 shows a perspective illustration of the mold insert from FIG. 1 in a non-finished state.

FIG. 2 shows a perspective illustration of the mold insert 1 from FIG. 1 in an oblique view from above, the mold insert 1 being illustrated in a not-yet-finished state.

More precisely, FIG. 2 shows the mold insert 1 in a state in which the wear-protection layer has not yet been formed on the strips 2 and multiple, but not all, strips 2 of the mold insert 1 are fitted together, and therefore it is not yet the case that all of the mold impressions 3 of the mold insert 1 have been formed.

Multiple connecting elements 4, which protrude from two of the transverse strips 2b or from one of the longitudinal strips 2a, can be seen in FIG. 2.

Figure 3:
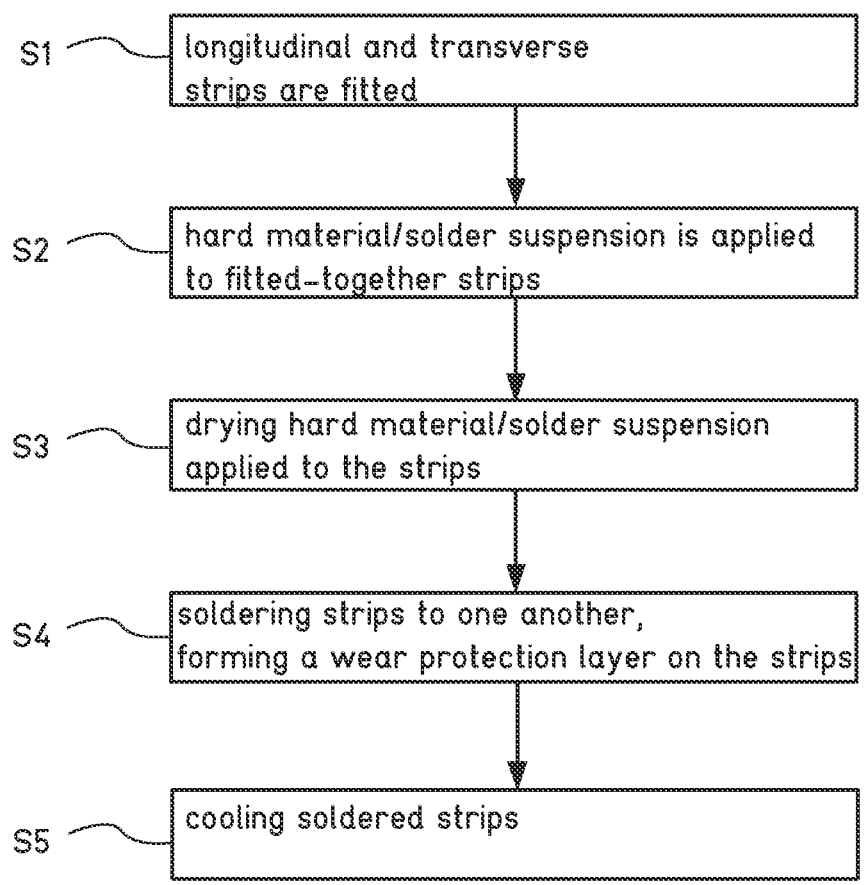
FIG. 3 shows a schematic method sequence of an exemplary embodiment of a method according to the invention for the manufacture of the mold insert from FIG. 1.

FIG. 3 shows a schematic method sequence of a method for manufacturing the mold insert 1 from FIG. 1.

The method comprises five method steps that follow one another (method steps S1 to S5).

First of all, the longitudinal strips 2a and transverse strips 2b are fitted together using the connecting elements 4 (method step S1).

A hard material/solder suspension is then applied to, in particular sprayed onto, the fitted-together strips 2 (method step S2).

Then, the hard material/solder suspension applied to the strips 2 is allowed to dry in air or in another gas atmosphere (method step S3).

After this, the strips 2 are soldered to one another in a vacuum furnace using a vacuum soldering method, a wear-protection layer being formed on the strips 2 from the hard material applied to the strips 2 (method step S4). The soldering method in the present case is a high-temperature vacuum soldering method in which the strips 2 are heated to a temperature of approx. 1150° C., for example. The process duration for the combined soldering of the strips 2 and the formation of the wear-protection layer is preferably between 10 and 15 hours.

After the strips 2 have been soldered together, the strips 2 are allowed to cool down slowly, in the course of which the strips 2 cool down to ambient temperature, without the soldered-together strips 2 having been quenched beforehand in a liquid coolant (method step S5).

In principle, it is possible to apply the hard material/solder suspension to the strips 2 and to allow the hard material/solder suspension to dry before the strips 2 are fitted together. That is to say, method steps S2 and S3 may in principle be carried out before method step S1.

The invention has been described in detail on the basis of the exemplary embodiment illustrated. However, the invention is not restricted to or by the example disclosed. A person skilled in the art will be able to derive other variants from this exemplary embodiment without deviating from the concepts on which the invention is based.

LIST OF REFERENCE SIGNS

1 Mold insert
2 Strip
2a Longitudinal strip
2b Transverse strip
3 Mold impression
4 Connecting element
d Thickness
S1 Method step—fitting the strips together
S2 Method step—applying a hard material/solder suspension to the strips
S3 Method step—allowing the hard material/solder suspension to dry
S4 Method step—soldering the strips together using a vacuum soldering method and forming a wear-protection layer
S5 Method step—allowing the strips to cool down to ambient temperature

The invention claimed is:

1. A method for manufacturing a mold insert for producing shaped bodies, the method comprising:
   providing multiple strips, each of the multiple strips having at least one opening for receiving a connecting element;
   fitting together the multiple strips to form wall elements of the mold insert to be manufactured by inserting a connecting element in the openings of the multiple strips in such that each of the connecting elements engaging in two openings of two adjacent strips of the multiple strips; and
   directly soldering adjacent strips of the fitted-together strips to one another.

2. The method according to claim 1, which comprises soldering the fitted-together strips to one another using a vacuum soldering method.

3. The method according to claim 2, which comprises soldering with a vacuum brazing method.

4. The method according to claim 1, which comprises, after the strips have been soldered to one another, allowing the strips to cool down to ambient temperature without the soldered-together strips having been quenched beforehand in a liquid coolant.

5. The method according to claim 1, which comprises forming a wear-protection layer on the strips after fitting the strips to one another.

6. The method according to claim 4, which comprises applying a hard material to the fitted-together strips before the soldering step, and, subsequent to soldering the strips to one another, forming the wear-protection layer on the strips from the applied hard material.

7. The method according to claim 6, wherein the hard material is a carbide.

8. The method according to claim 7, wherein the hard material is a carbide selected from the group consisting of tungsten carbide, titanium carbide, and chromium carbide.

9. The method according to claim 6, which comprises applying the hard material to the strips as a constituent part of a hard material and solder suspension.

10. The method according to claim 9, which comprises applying the hard material and solder suspension by spraying the suspension onto the strips and, subsequent to spraying, allowing the suspension to dry in air or in another gas atmosphere.

11. The method according to claim 1, which comprises producing the mold insert for forming blocks or slabs.

* * * * *